(12) United States Patent
Wu

(10) Patent No.: US 7,959,364 B2
(45) Date of Patent: Jun. 14, 2011

(54) LENS PROTECTION STRUCTURE FOR MINIATURE LENS FOCUSING MECHANISM

(75) Inventor: Fu-Yuan Wu, Yangmei Taoyuan (TW)

(73) Assignee: TDK Taiwan Corporation, Taipei (TW)

( * ) Notice: Subject to any disclaimer, the term of this patent is extended or adjusted under 35 U.S.C. 154(b) by 80 days.

(21) Appl. No.: 12/435,042

(22) Filed: May 4, 2009

(65) Prior Publication Data
US 2010/0277800 A1 Nov. 4, 2010

(51) Int. Cl.
*G03B 17/12* (2006.01)
(52) U.S. Cl. .................................................. 396/448
(58) Field of Classification Search .................. 396/448
See application file for complete search history.

(56) References Cited

U.S. PATENT DOCUMENTS

| | | | | |
|---|---|---|---|---|
| 4,385,812 A * | 5/1983 | Wille et al. | | 359/511 |
| 4,714,333 A * | 12/1987 | Tamamura et al. | | 396/29 |
| 6,541,284 B2 * | 4/2003 | Lam | | 438/7 |
| 7,227,577 B2 * | 6/2007 | Tanida et al. | | 348/340 |
| 7,324,290 B2 * | 1/2008 | Chong et al. | | 359/694 |
| 7,460,770 B2 * | 12/2008 | Huang et al. | | 396/25 |
| 7,555,211 B2 * | 6/2009 | Go | | 396/268 |
| 7,600,930 B2 * | 10/2009 | Wang et al. | | 396/448 |
| 7,646,427 B2 * | 1/2010 | Sato et al. | | 348/374 |
| 2008/0063390 A1 * | 3/2008 | Hsiao et al. | | 396/133 |
| 2008/0095528 A1 * | 4/2008 | Jao et al. | | 396/458 |
| 2008/0216579 A1 * | 9/2008 | Hoffman | | 73/708 |

* cited by examiner

*Primary Examiner* — Clayton E LaBalle
*Assistant Examiner* — Leon W Rhodes
(74) *Attorney, Agent, or Firm* — Muncy, Geissler, Olds & Lowe, PLLC

(57) ABSTRACT

A lens protection structure for miniature lens focusing mechanism includes a lens, a lens driving mechanism and a protective glass. The lens focuses light on an image sensor to thereby form an image thereon. The lens driving mechanism includes a hollow structure, in which the lens is received and driven to linearly move in an optical axis direction, so as to focus light on the image sensor. The protective glass is provided at a lens inlet of the lens driving mechanism, and is fixedly held to the lens driving mechanism by a plurality of forward projected stoppers formed at the lens inlet. With the protective glass located in front of the lens, the lens is protected against dust and damage by external force when being assembled to form a half-finished product or stored as a half-finished product.

14 Claims, 5 Drawing Sheets

LENS PROTECTION STRUCTURE FOR MINIATURE LENS FOCUSING MECHANISM

FIELD OF THE INVENTION

The present invention relates to a lens protection structure, and more particularly to a lens protection structure for miniature lens focusing mechanism, in which a protective glass is mounted to a lens driving mechanism to locate in front of a lens, so as to protect the lens against damage and dust.

BACKGROUND OF THE INVENTION

With the advancement in scientific technologies and the modularization and miniaturization of camera lens, it is now possible to produce digital cameras having a very small volume, and most of currently available mobile phones are provided with the function of a digital camera. In a miniature lens, there are many different auto-focusing driving mechanisms.

FIG. 1 is an exploded perspective view of a conventional lens focusing structure. As shown, the lens focusing structure includes a front cover 10, a rear cover 11, an outer frame 13 being provided at four inner wall surfaces with a magnet 14 each, an lens holder 12 internally provided with screw threads 15 for a lens 16 to screw thereinto, a winding 17 wound around an outer side of the lens holder 12, and two plate springs 18 separately connected to a front and a rear end of the lens holder 12. The lens holder 12 is supported by the two plate springs 18 to axially movably locate in the outer frame 13 and be surrounded by the four magnets 14. When the winding 17 is supplied with an amount of current to thereby produce a magnetic field polarity, the lens holder 12 and the four magnets 14 mutually repulse or attract, bringing the lens holder 12 and the lens 16 to automatically focus.

In the conventional lens focusing mechanism, there is a front open inlet to facilitate convenient screwing of the lens 16 into the lens holder 12. For a camera device provided with the conventional lens focusing mechanism to provide an image shooting function, such as a mobile phone or a digital camera, an outer cover or case of the camera device is provided with a light-transmittable flat lens, such as a glass plate, so as to protect the lens. However, the lens is subject to dust or damage by external force in the process of assembling to form a half-finished product. On the other hand, when a glass plate is directly mounted to the open inlet of the lens focusing mechanism, the lens can be protected against damage and dust in the whole process of assembling, and the camera device using the lens focusing mechanism with a lens protective glass can omit the flat lens therefrom to largely reduce the manufacturing cost and the overall thickness thereof.

It is therefore tried by the inventor to develop an improved lens protection structure, so that a lens protective glass can be fixedly held to a lens inlet of the miniature lens focusing mechanism by a locating structure.

SUMMARY OF THE INVENTION

A primary object of the present invention is to provide a lens protection structure for miniature lens focusing mechanism, in which a glass is included for protecting a lens against damage or dust when the lens is assembled to form a half-finished product or stored as a half-finished product.

Another object of the present invention is to provide a lens protection structure for miniature lens focusing mechanism, which allows a camera device using the miniature lens focusing mechanism with the lens protection structure to omit a flat lens therefrom and accordingly has reduced overall thickness and manufacturing cost.

To achieve the above and other objects, the lens protection structure according to the present invention includes a lens, a lens driving mechanism and a protective glass. The lens focuses light on an image sensor to thereby form an image thereon. The lens driving mechanism includes a hollow structure, in which the lens is received and driven to linearly move in an optical axis direction, so as to focus light on the image sensor. The protective glass is provided at a lens inlet of the lens driving mechanism, and is fixedly held in place on the lens driving mechanism by a plurality of forward projected stoppers formed at the lens inlet. With the protective glass located in front of the lens, the lens is protected against dust and damage by external force when being assembled to from a half-finished product or stored as a half-finished product.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
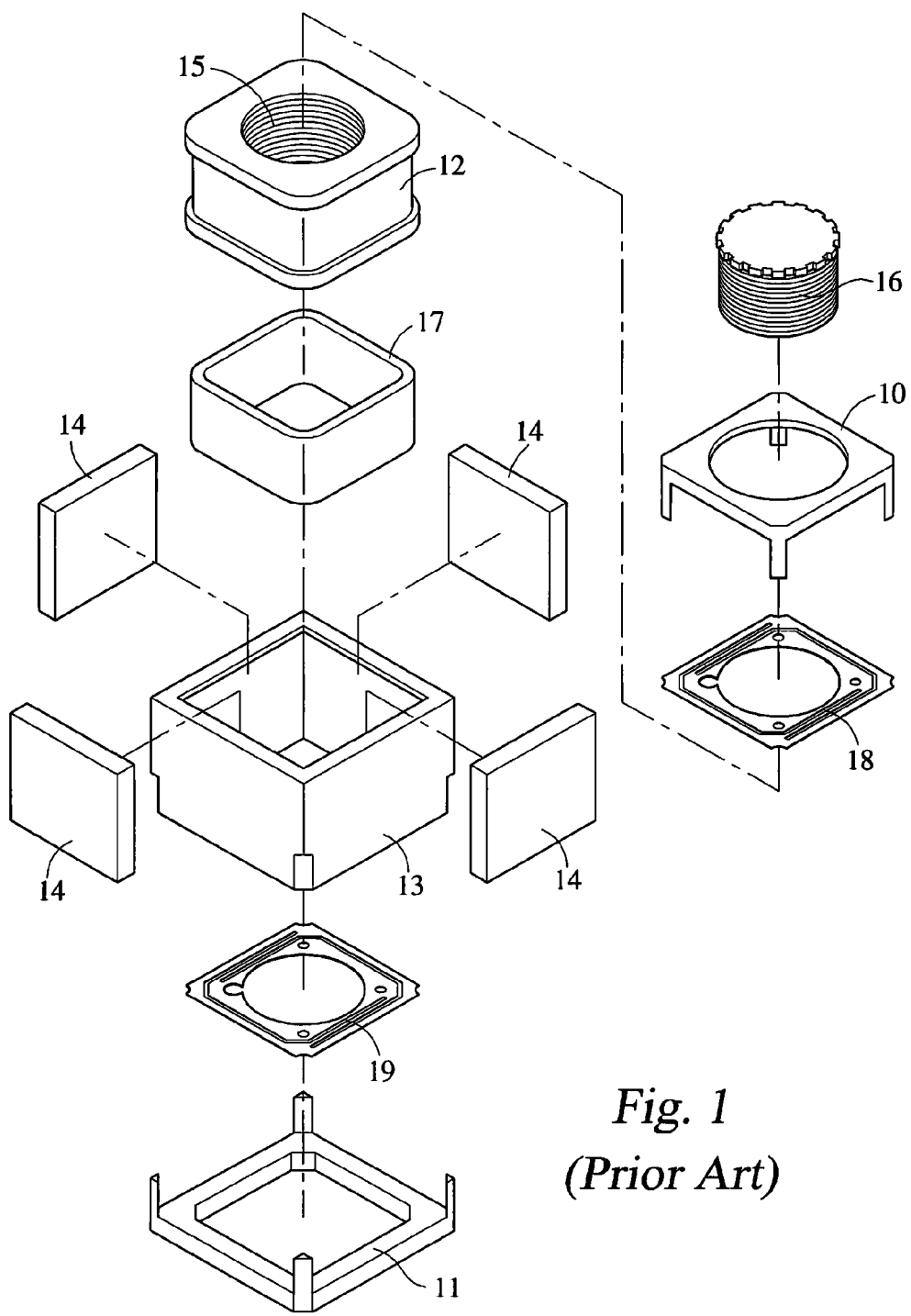
FIG. 1 is an exploded perspective view of a conventional miniature lens focusing mechanism.
Figure 2:
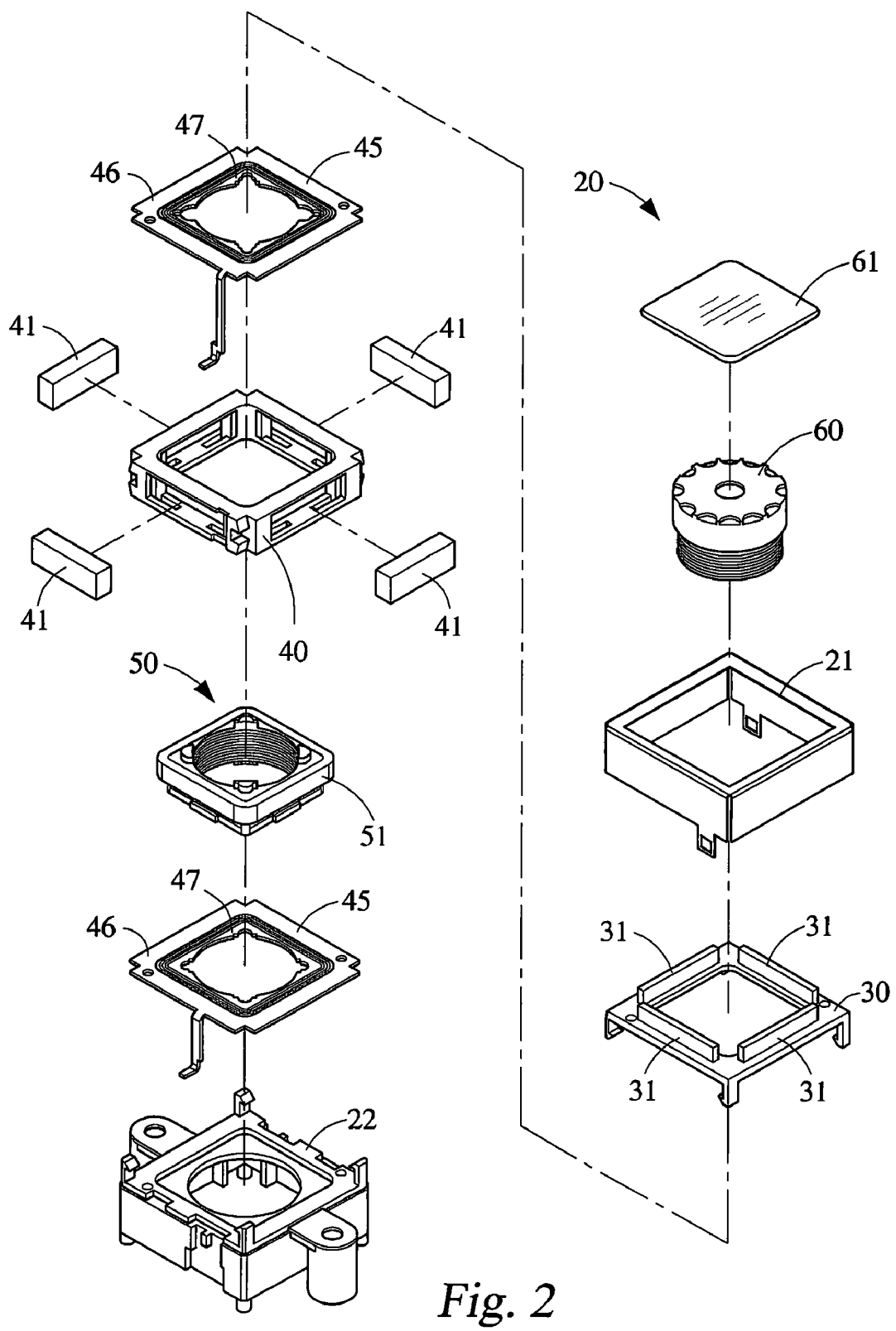
FIG. 2 is an exploded perspective view of a miniature lens focusing mechanism with a lens protection structure according to a first embodiment of the present invention.

Please refer to FIG. 2 that is an exploded perspective view of a miniature lens focusing mechanism with a lens protection structure according to a first embodiment of the present invention. As shown, the lens protection structure includes a lens 60, a lens driving mechanism 20, and a protective glass 61. The lens driving mechanism 20 includes an outer cover 21 and a seat 22, which are assembled to each other to define a receiving space for receiving a front cover 30, a supporting frame 40, and a lens holder 50 therein. The lens holder 50 is a hollow member for receiving the lens 60 therein. A winding 51 is wound around an outer side of the lens holder 50, and the lens holder 50 is centered in the hollow supporting frame 40 to be linearly movable forward and backward in an optical axis direction. Magnetic members 41 are further arranged on four sides of the supporting frame 40.

The lens holder 50 is connected to the supporting frame 40 via at least one plate spring 45. Preferably, there are two plate springs 45 located at a front and a rear end of the lens holder 50 to elastically connect the lens holder 50 to the supporting frame 40. Each of the plate springs 45 includes an outer fixed portion 46 and an inner movable portion 47 connected to the outer fixed portion 46 via a plurality of particularly shaped flexible slender strips. The outer fixed portions 46 of the plate springs 45 are connected to the supporting frame 40 while the inner movable portions 47 of the plate springs 45 are connected to the lens holder 50, such that the lens holder 50 is elastically held to a center of the supporting frame 40 while being linearly movable forward and backward in the optical axis direction.

When an amount of current is supplied to the winding 51 to thereby produce an electromagnetic field, the winding 51 and the magnetic members 41 on the supporting frame 40 mutually repulse or attract, bringing the lens holder 50 and the lens 60 to linearly move in the optical axis direction, so that light passes through the lens 60 can be focused on an image sensor (not shown) to form an image thereon.

As can be seen from the first embodiment illustrated in FIG. 2, the protective glass 61 is disposed at a front lens inlet of the lens driving mechanism 20. The front cover 30 is provided on a front face with a plurality of forward projected stoppers 31, so as to define a receiving area enclosed in the stoppers 31 for mounting the protective glass 61 thereto. Preferably, the protective glass 61 and the receiving area are square, rectangular, round, or octagonal in shape, or in any other polygonal shapes.

The outer cover 21 is made of a metal material to isolate electromagnetic interference generated when the winding 51 is supplied with electric current. The outer cover 21 is provided with an opening, which has a size the same as that of the receiving area defined by the stoppers 31. Therefore, after the outer cover 21 has been assembled to the seat 22, the lens 60 can be installed in the lens driving mechanism 20 and the protective glass 61 can be further mounted to the receiving area defined by the stoppers 31.

Figure 3:
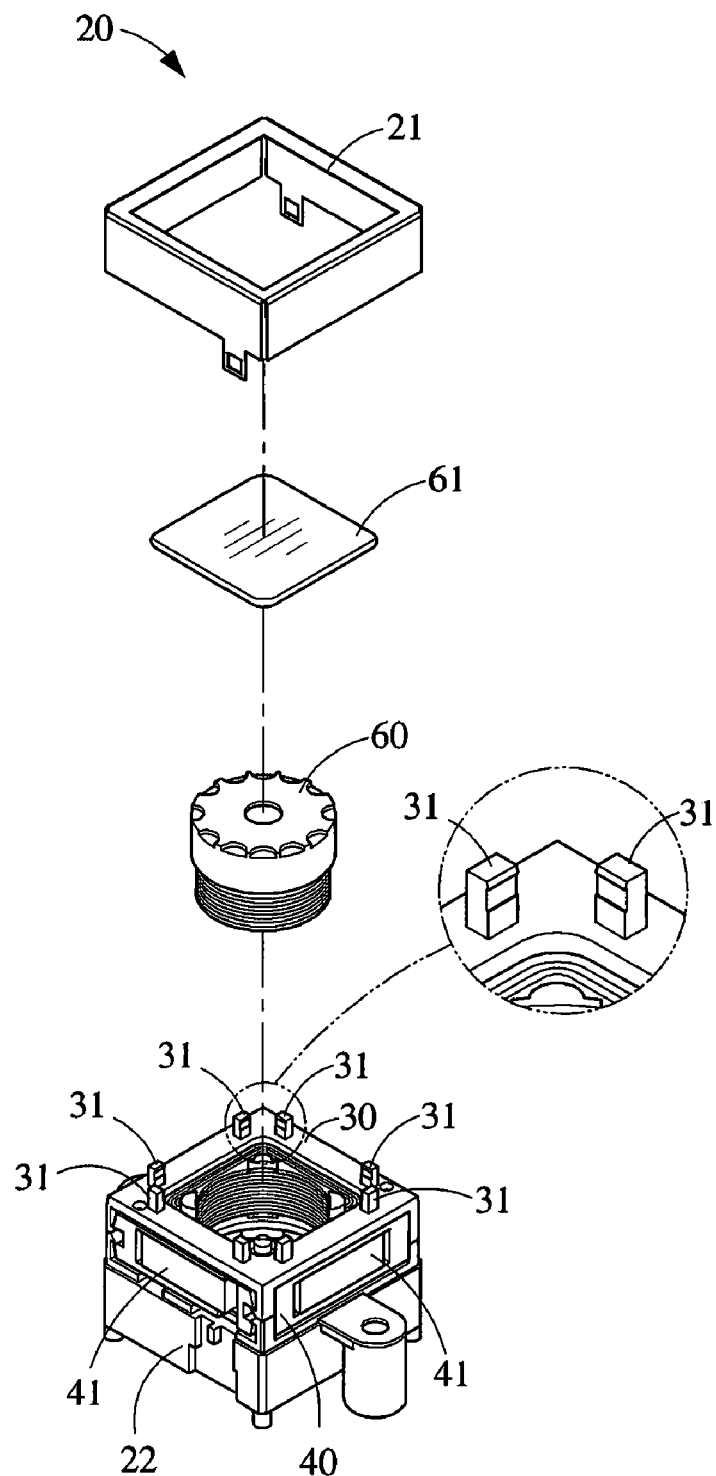
FIG. 3 is a partially exploded perspective view showing a lens protection structure for miniature lens focusing mechanism according to a second embodiment of the present invention.

Preferably, the stoppers 31 are plates forward projected from the front face of the front cover 30. However, as can be seen from a second embodiment shown in FIG. 3, the stoppers 31 can be otherwise a plurality of short posts. That is, the stoppers 31 can be differently shaped, so long as they can define and enclose the receiving area and confine or fixedly hold the protective glass 61 thereto. The protective glass 61 can be a glass plate or a resin glass or a clear acrylic glass.

Preferably, the protective glass 61 can be fixedly held to the glass receiving area defined by the stoppers 31 using an adhesive bonding agent. Alternatively, the stoppers 31 can be provided with grooves as shown in the enlarged circled area of FIG. 3, so that the protective glass 61 can be firmly held to the stoppers 31 through engagement of the peripheral edges of the protective glass 61 with the grooves on the stoppers 31 without the need of using any bonding agent.

Figure 4:
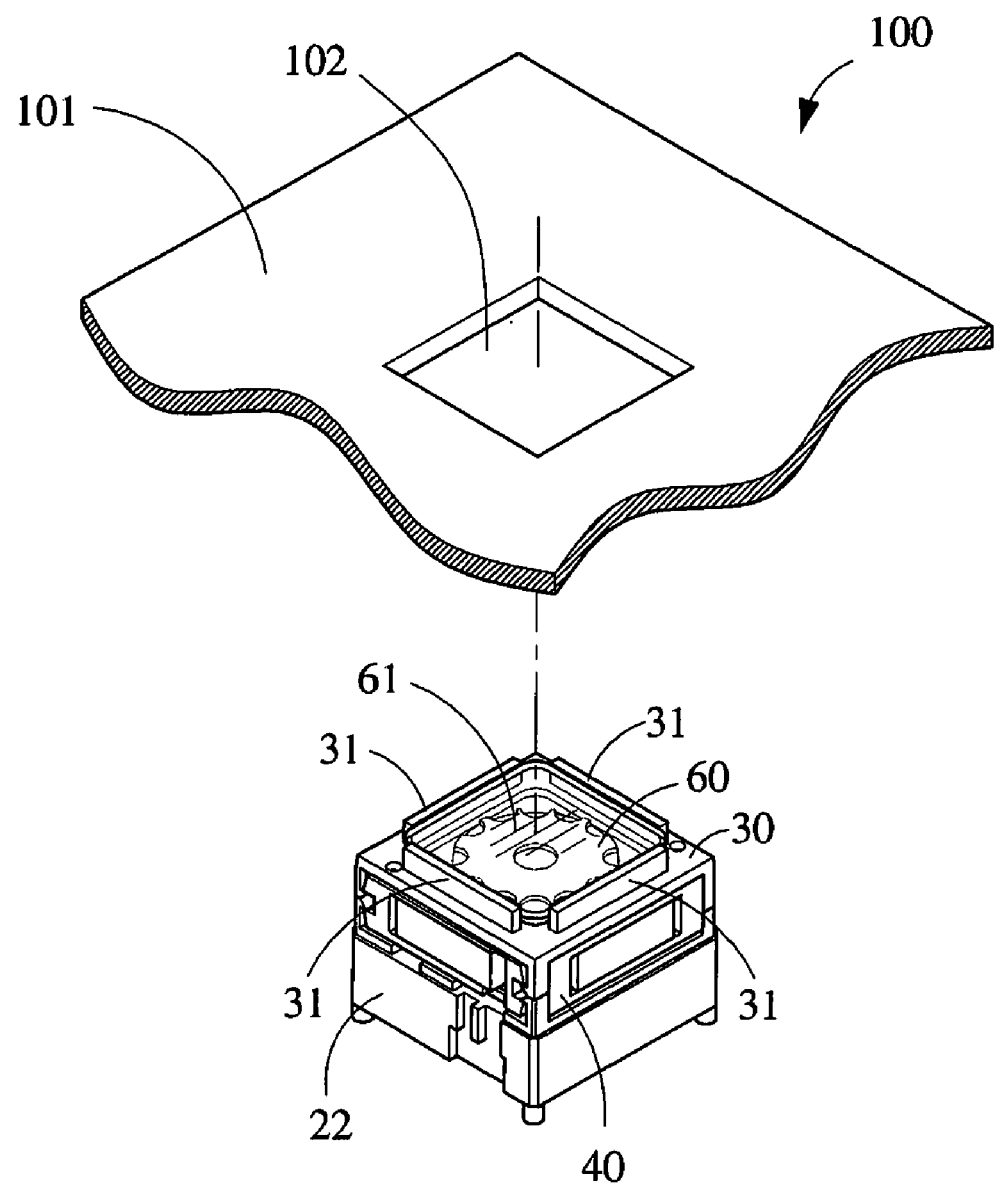
FIG. 4 shows an example of installing the lens protection structure of the present invention on a camera device.

Please refer to FIG. 4 that shows an example of installing the lens protection structure of the present invention on a camera device 100, which can be, for example, a mobile phone. Since the lens 60 is under the protection of the protective glass 61, the camera device 100 needs only to have a through hole 102 formed on a cover 101 thereof without the need of providing an additional flat lens at the through hole 102. By fitly engaging the stoppers 31 with the through hole 102, the lens driving mechanism 20 can be stably mounted to the cover 101 of the camera device 100. In an operable embodiment, the outer cover 21 can be omitted and replaced by the cover 101 of the camera device 100, as shown in FIG. 4. With the present invention, screws or other connecting or locating structures for locking the lens driving mechanism 20 to the camera device 100 can be reduced to enable further reduced thickness of the miniature lens focusing mechanism.

In brief, with the lens protection structure of the present invention, the miniature lens focusing mechanism can be more easily installed on the camera device 100 to reduce the manufacturing cost of the camera device 100. Further, since the camera device 100 no longer requires a flat lens for mounting to the cover 101 thereof, the thickness of the camera device 100 can be further reduced to increase its competing ability in the market.

Figure 5:
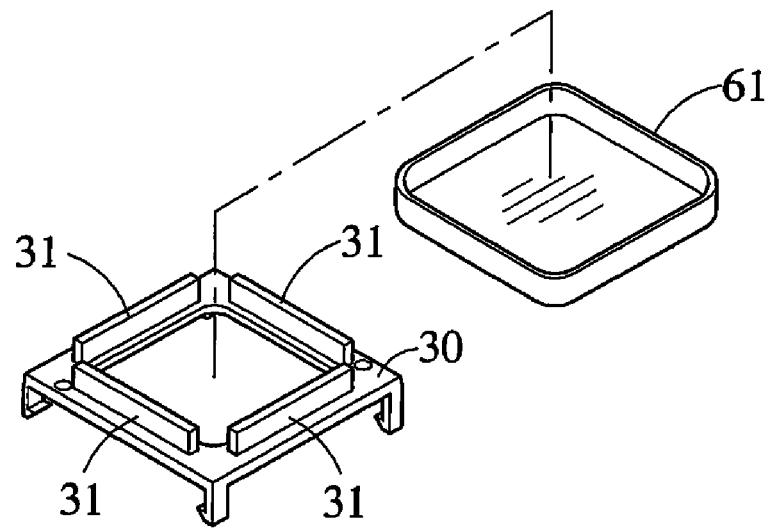
FIG. 5 schematically shows a lens protection structure according to a third embodiment of the present invention.
Figure 6:
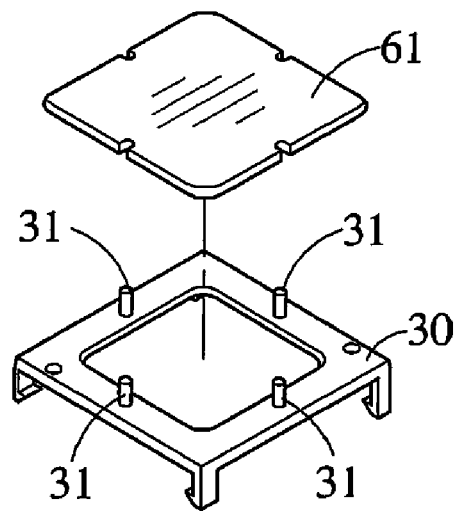
FIG. 6 schematically shows a lens protection structure according to a fourth embodiment of the present invention.

In a third embodiment of the present invention as shown in FIG. 5, the protective glass 61 is cap-shaped for directly fitting around the stoppers 31. Or, in a fourth embodiment of the present invention as shown in FIG. 6, the stoppers 31 are round posts and the protective glass 61 is provided along its peripheral edges with spaced notches corresponding to the round posts, so that the protective glass 61 can be laid on the front face of the front cover 30 through engagement of the notches with the stoppers 31 in the form of round posts.

What is claimed is:

1. A lens protection structure for a miniature lens auto-focusing mechanism adapted for mounting on a camera device, comprising:
   a lens for focusing light on an image sensor to form an image thereon;
   an auto-focusing lens driving mechanism including a hollow structure, in which the lens is received and driven to linearly move in an optical axis direction, so as to focus light on the image sensor; and
   a protective glass being provided at a lens inlet of the lens driving mechanism, and being integrated with and fixedly held to the lens driving mechanism by a plurality of forward projected stoppers formed at the lens inlet,
   wherein the camera device is formed on a cover thereof with a through hole without any flat lens mounted thereto and the stoppers on the lens driving mechanism are fitly engaged with the through hole on the cover of the camera device to thereby hold the lens, the lens driving mechanism and the protective glass to the camera device.

2. The lens protection structure for a miniature lens focusing mechanism as claimed in claim 1, wherein the protective glass is selected from the group consisting of a glass plate, a resin glass, and a clear acrylic glass.

3. The lens protection structure for a miniature lens focusing mechanism as claimed in claim 1, wherein the stoppers each are selected from the group consisting of a plate and a short post.

4. The lens protection structure for a miniature lens focusing mechanism as claimed in claim 1, wherein the stoppers each are provided at a predetermined position with a groove for engaging with peripheral edges of the protective glass, such that the protective glass is held to the lens driving mechanism.

5. The lens protection structure for a miniature lens focusing mechanism as claimed in claim 1, wherein the protective glass is provided along its peripheral edges with a plurality of spaced notches corresponding to the stoppers, so that the protective glass is fixedly held to the stopper through engagement of the notches with the stoppers.

6. A lens protection structure for a miniature lens auto-focusing mechanism adapted for mounting on a camera device, comprising:
   a lens for focusing light on an image sensor to form an image thereon;
   an auto-focusing lens driving mechanism including a hollow structure, in which the lens is received and driven to linearly move in an optical axis direction, so as to focus light on the image sensor; and
   a protective glass being provided at a lens inlet of the lens driving mechanism, and being integrated with and fixedly held to the lens driving mechanism by a plurality of forward projected stoppers formed at the lens inlet, wherein the protective glass is cap-shaped for covering around the stoppers.

7. The lens protection structure for a miniature lens focusing mechanism as claimed in claim 6, wherein the protective glass is selected from the group consisting of a glass plate, a resin glass, and a clear acrylic glass.

8. The lens protection structure for a miniature lens focusing mechanism as claimed in claim 6, wherein the stoppers each are selected from the group consisting of a plate and a short post.

9. The lens protection structure for a miniature lens focusing mechanism as claimed in claim 6, wherein the stoppers each are provided at a predetermined position with a groove for engaging with peripheral edges of the protective glass, such that the protective glass is held to the lens driving mechanism.

10. The lens protection structure for a miniature lens focusing mechanism as claimed in claim 6, wherein the protective glass is provided along its peripheral edges with a plurality of spaced notches corresponding to the stoppers, so that the protective glass is fixedly held to the stopper through engagement of the notches with the stoppers.

11. A lens protection structure for a miniature lens auto-focusing mechanism adapted for mounting on a camera device, comprising:
  a lens for focusing light on an image sensor to form an image thereon;
  an auto-focusing lens driving mechanism including a hollow structure, in which the lens is received and driven to linearly move in an optical axis direction, so as to focus light on the image sensor; and
  a protective glass being provided at a lens inlet of the lens driving mechanism, and being integrated with and fixedly held to the lens driving mechanism by a plurality of forward projected stoppers formed at the lens inlet,
  wherein the protective glass is provided along its peripheral edges with a plurality of spaced notches corresponding to the stoppers, so that the protective glass is fixedly held to the stopper through engagement of the notches with the stoppers.

12. The lens protection structure for a miniature lens focusing mechanism as claimed in claim 11, wherein the protective glass is selected from the group consisting of a glass plate, a resin glass, and a clear acrylic glass.

13. The lens protection structure for a miniature lens focusing mechanism as claimed in claim 11, wherein the stoppers each are selected from the group consisting of a plate and a short post.

14. The lens protection structure for a miniature lens focusing mechanism as claimed in claim 11, wherein the stoppers each are provided at a predetermined position with a groove for engaging with peripheral edges of the protective glass, such that the protective glass is held to the lens driving mechanism.

* * * * *